No. 784,468. Patented March 7, 1905.

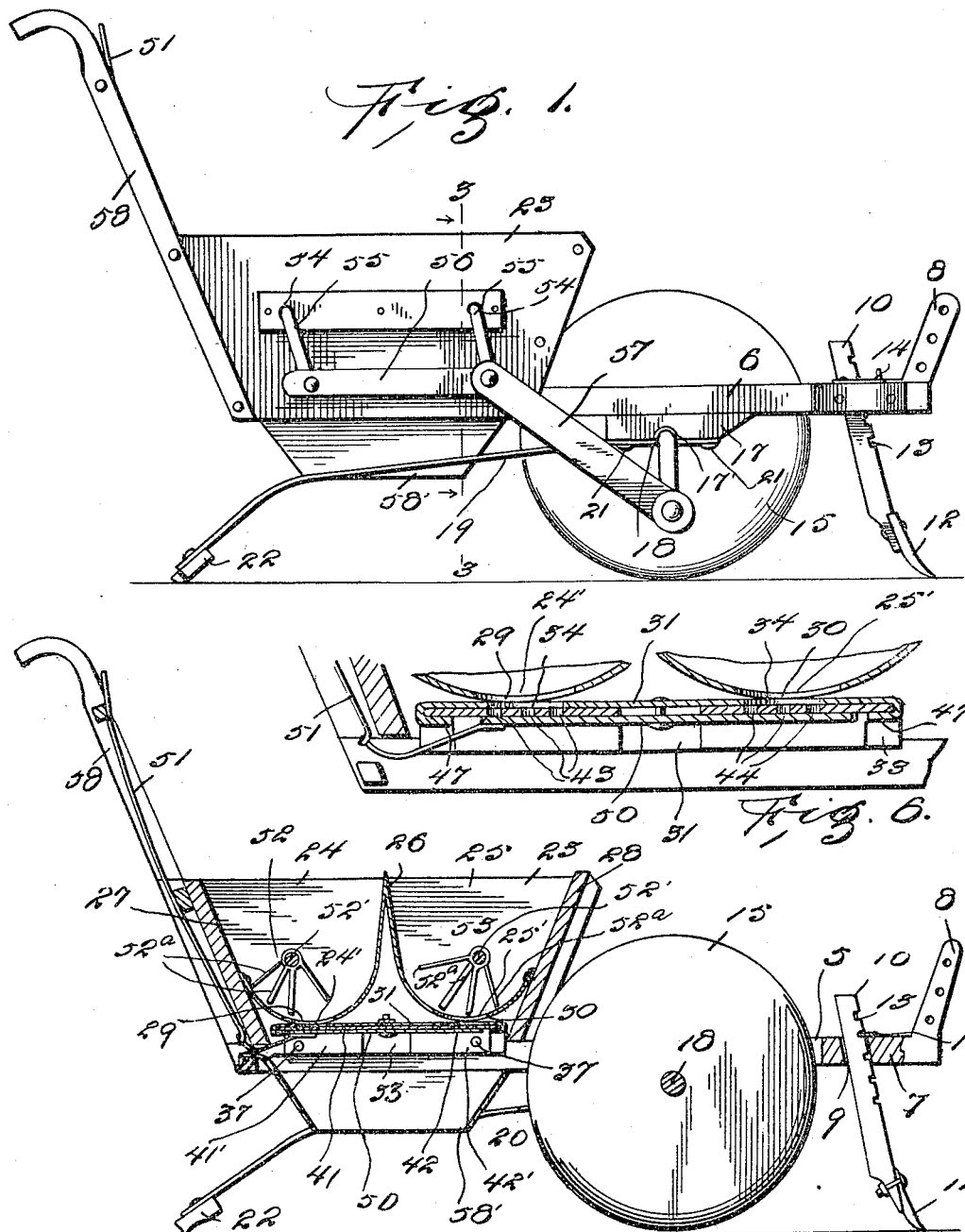

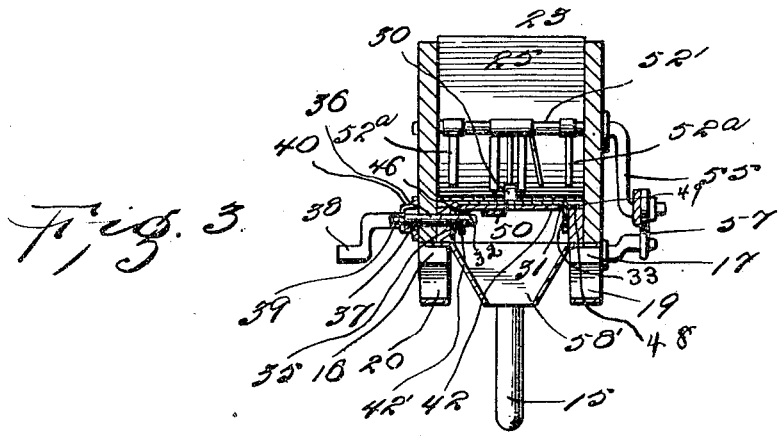
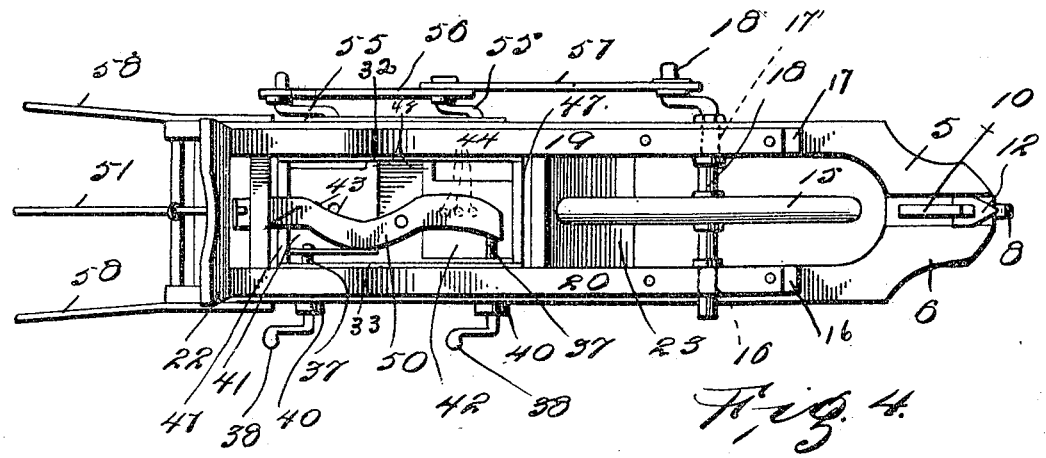
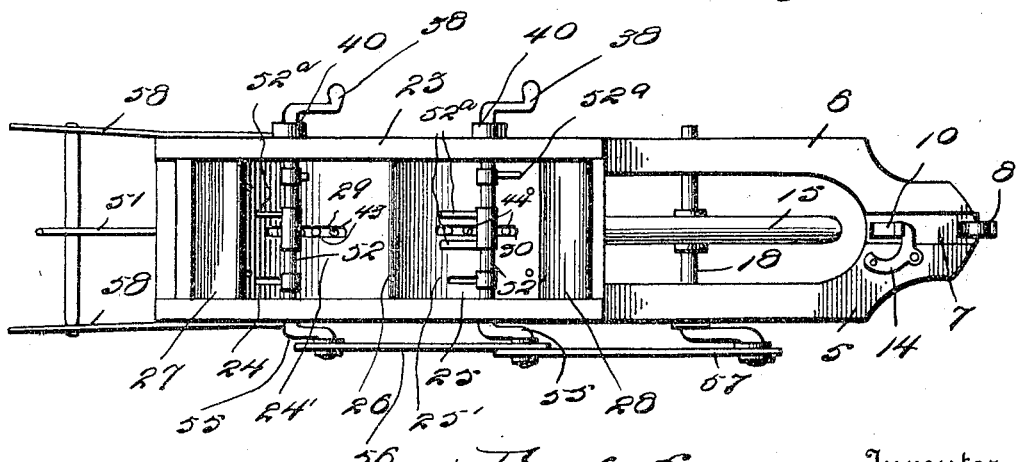

UNITED STATES PATENT OFFICE.

GEORGE L. BROWN, OF LEE, FLORIDA.

COTTON-PLANTER AND FERTILIZER-DISTRIBUTER.

SPECIFICATION forming part of Letters Patent No. 784,468, dated March 7, 1905.

Application filed January 18, 1904. Serial No. 189,556.

*To all whom it may concern:*

Be it known that I, GEORGE L. BROWN, a citizen of the United States, residing at Lee, in the county of Madison, State of Florida, have invented certain new and useful Improvements in Cotton-Planters and Fertilizer-Distributers; and I do hereby declare the following to be a full, clear, and exact description of the invention, such as will enable others skilled in the art to which it appertains to make and use the same.

This invention relates to planters, and more particularly to that class designed especially for planting cotton-seed, and has for its object to provide a planter which will embody in a single implement means for distributing seed and fertilizer by one operation, means being provided for varying relatively the supplies of seed and fertilizer and for entirely cutting off the supply of both when desired.

A further object of the invention is to provide a planter which will open a furrow, deposit seed therein, and afterward close the furrow.

In the drawings forming a portion of this specification, in which like numerals of reference indicate similar parts in the several views, Figure 1 is a side elevation of the complete device. Fig. 2 is a longitudinal section. Fig. 3 is a transverse section on line 3 3 of Fig. 1. Fig. 4 is a bottom plan view of the device with the chute removed. Fig. 5 is a top plan view of the complete device, and Fig. 6 is an enlarged sectional view showing the means for regulating the discharge from the hoppers.

Referring now to the drawings, there are shown sills 5 and 6, having secured between their forward ends the extension 7 of a clevis 8, the extension 7 having a passage therethrough for the reception of the stock 10 of a furrow-opener 12.

The forward edge of the stock is provided with a series of notches 13, which are adapted to receive a catch 14, pivoted to the sill 5, said catch thus holding the furrow-opener in any desired location in a vertical plane. The passage 9 is preferably formed diagonally, as shown, to give a slant to the stock 10.

Between the sills 5 and 6, rearwardly of the mechanism just described, a ground-wheel 15 is mounted. The bearings of this wheel are of peculiar construction and consist of supplemental blocks 16 and 17, which are attached to the lower faces of the sills 5 and 6, respectively. The lower faces of these blocks are provided with notches 16' and 17', respectively, said notches receiving the axle 18 of the wheel 15. To prevent disengagement of the axle from the notches, a pair of spring-metal plates 19 and 20 are secured against the lower faces of the blocks 16 and 17 by means of bolts 21, and these spring-plates extend rearwardly and downwardly from the blocks, beyond the rear ends of the sills 5 and 6, and have secured to their free ends a cover-board 22, which is adapted to close a furrow formed by the furrow-opener after seed and fertilizer have been deposited therein by a mechanism which will be presently explained.

Secured to the rearward ends of the sills 5 and 6 is a hopper 23, divided into compartments 24 and 25 by a central transverse partition 26, which is formed of a piece of sheet metal bent upon itself, its ends being bent into arch shape and secured to the ends 27 and 28 of the hopper to form the bottoms 24' and 25' of the compartments 24 and 25, respectively. The bottoms 24' and 25' are provided with slots 29 and 30, respectively, for the passage of the contents of the compartments therethrough. Below the hopper 23, between the sills 5 and 6, there is disposed a metallic plate 31, which has its side edges 32 and 33 bent downwardly and secured to the inner faces of the sills 5 and 6, respectively. This metallic plate 31 is provided with a pair of longitudinal slots 34, which lie below and in alinement with the slots 29 and 30.

A pair of worm-screws 37 pass through the sill 5 and the downturned edge 33 of the plate 31. These worm-screws 37 are provided with cranks 38 upon their outer ends, which have reduced portions 39 adjacent to the cranks. Upon these reduced portions 39 are collar-plates 40, which are secured to the outer face of the sill 5. Against the lower face of the plate 31 are slidably mounted a pair of plates 41 and 42, which are provided with series of perforations 43 and 44, which are adapted to register at times with the slots 29 and 30 and at times to be moved out of registration therewith. To accomplish this result, the plates 41 and 42 are provided with downwardly-turned lugs 41' and 42', respectively, and these lugs are provided with threaded perforations 46, one of which is engaged with each of the worm-screws 37. It will be seen that through the action of the screws 37 the plates 41 and 42 will be caused to move transversely of the plate 31 to move the perforations 43 and 44 into or out of registration with the slots 29 and 30, thus varying the amount of matter passing therethrough.

To hold the plates 41 and 42 in position, the end edges 47 of the plate 31 are bent backwardly and under the plate to form guides for the slide-plates 41 and 42. These plates are also provided with laterally-extending lugs 48, which are slidably engaged with perforations 49 in the edge 32 of the plate 31.

Pivoted to the plate 31, between the slides 41 and 42, is an angular plate 50, which extends outwardly between the rearward ends of the sills 5 and 6 and which is adapted to be moved through the medium of a hand-lever 51 to close or open the passages formed by the slots 29 and 30, the slots 34, and the perforations 43 and 44.

Within the compartments 24 and 25 are agitators 52 and 53, each of which comprises a rock-shaft 52', having fingers 52$^a$ radiating from the lower half of the circumferences thereof. Each of the rock-shafts 52' is journaled in bearings 54 in the side of the hopper 23 and terminating at one end exteriorly of the hopper in cranks 55, which are connected by a link 56.

The axle 18 of the ground-wheel 15 terminates at one end in a crank 18', which is connected with one of the cranks 55 by means of a pitman 57, which imparts a rocking motion to the shafts 52' when the ground-wheel is revolved, thus agitating the contents of the hopper and insuring the passage thereof through the openings described above.

To the corners of the hopper 23 are attached handles 58, by means of which the implement is guided. In operation the forward compartment 25 is filled with cotton or other seed and the rearward compartment 24 is filled with fertilizer. The plates 41 and 42 are then adjusted to admit of the passage of the correct amount of each, and the angular plate 50 is moved through the medium of the hand-lever 51 to open the passages of the compartments.

If the implement be now moved over the ground, a furrow will be formed by the opener 12, and the seed and fertilizer set in motion by the agitators will be discharged from the compartments in a chute 58, and thus into the furrow, which will be closed by the cover-board 22. If it is so desired, this cover-board may be removed and a pair of scooter-plows substituted therefor.

In practice modifications of the specific construction shown may be made and any suitable materials used without departing from the spirit of the invention.

What is claimed is—

1. A combination planter and fertilizer-distributer, comprising sills, a furrow-opener mounted at the forward end thereof, a ground-wheel mounted between the sills, a hopper mounted rearwardly of the ground-wheel, a partition within the hopper to divide it into two compartments, the said partition being formed of sheet metal bent upon itself, the ends being bent in arch shape and attached to the ends of the hopper, and the arch-shaped portions of the ends being perforated, means for conducting the contents of the compartments to a furrow and means for closing the furrow.

2. A combination planter and fertilizer-distributer, comprising sills, receptacles mounted upon the sills for the reception of seed and fertilizer respectively, the receptacles having slots in the bottoms thereof, perforated plates slidably disposed below the receptacles, means for moving the plates to bring their perforations into and out of registration with the slots, additional means for opening and closing the slots consisting of a plate pivoted to the bottom of the hopper, a furrow-opener mounted at the forward end of the sills and means for conveying the contents of the hoppers to a furrow.

3. A combination planter and fertilizer-distributer, comprising sills, a furrow-opener mounted at the forward end thereof, a ground-wheel mounted between the sills, receptacles mounted rearwardly of the ground-wheel, a plate having longitudinal slots and down-turned edges mounted below the hopper and between the sills, perforated plates slidably disposed below the first-named plate and having extensions passing through guides in the downturned edges in the said first-named plate, means for adjusting the said perforated plates, additional means for opening and closing the slots, said means consisting of a plate pivoted to the bottom of the first-named plate, a furrow-opener mounted at the forward ends of the sills and means for conveying the contents of the receptacles to a furrow.

In testimony whereof I affix my signature in presence of two witnesses.

GEORGE L. BROWN.

Witnesses:
J. L. SULLIVAN,
J. H. HAVEN.